United States Patent
Aymeloglu et al.

(10) Patent No.: US 8,909,597 B2
(45) Date of Patent: Dec. 9, 2014

(54) DOCUMENT-BASED WORKFLOWS

(71) Applicant: Palantir Technologies, Inc., Palo Alto, CA (US)

(72) Inventors: Andrew Aymeloglu, Palo Alto, CA (US); Nicholas Miyake, Palo Alto, CA (US); Brandon Burr, Palo Alto, CA (US); Derek Cicerone, Palo Alto, CA (US); Kevin Simler, Palo Alto, CA (US); Garry Tan, San Francisco, CA (US)

(73) Assignee: Palantir Technologies, Inc., Palo Alto, CA (US)

( * ) Notice: Subject to any disclaimer, the term of this patent is extended or adjusted under 35 U.S.C. 154(b) by 0 days.

(21) Appl. No.: 13/799,535

(22) Filed: Mar. 13, 2013

(65) Prior Publication Data

US 2013/0198624 A1     Aug. 1, 2013

Related U.S. Application Data

(63) Continuation of application No. 12/556,310, filed on Sep. 9, 2009, now Pat. No. 8,429,194.

(60) Provisional application No. 61/097,059, filed on Sep. 15, 2008, provisional application No. 61/122,695, filed on Dec. 15, 2008.

(51) Int. Cl.
```
G06F 17/00     (2006.01)
G06F 7/00      (2006.01)
G06F 3/0486    (2013.01)
G06F 17/22     (2006.01)
G06F 17/27     (2006.01)
```

(52) U.S. Cl.
CPC .......... *G06F 3/0486* (2013.01); *G06F 17/2288* (2013.01); *G06F 17/2765* (2013.01)
USPC ........... 707/608; 707/791; 707/805; 715/201; 715/204

(58) Field of Classification Search
CPC .................... G06F 17/30867; G06F 17/30017; G06F 11/3414; G06F 11/3419; G06F 11/3495; G06F 17/2247; G06F 17/24; G06F 17/30011; G06F 17/30607
USPC ............ 707/600–831, 899, 999.001–999.206
See application file for complete search history.

(56) References Cited

U.S. PATENT DOCUMENTS

| | | |
|---|---|---|
| 5,428,776 A | 6/1995 | Rothfield |
| 5,542,089 A | 7/1996 | Lindsay et al. |

(Continued)

FOREIGN PATENT DOCUMENTS

| | | |
|---|---|---|
| EP | 1647908 | 4/2006 |
| EP | 2634745 | 9/2013 |

(Continued)

OTHER PUBLICATIONS

Support.microsoft.com, "Frequently asked questions about Office Binder 97", 6 pages, Dec. 18, 2006, printed from the internet Feb. 11, 2010, http://support.microsoft.com/kb/843147.

(Continued)

*Primary Examiner* — Angelica Ruiz
(74) *Attorney, Agent, or Firm* — Hickman Palermo Truong Becker Bingham Wong LLP (57) ABSTRACT

A workflow application allows users to store, manage, and perform tasks related to workflows comprised of ordered sets of documents. The application provides an interface for creating and managing a workflow. Each document added to the workflow is assigned to a particular position in the workflow. Via the interface, the user saves data defining the workflow. In this manner, the workflow may be shared or preserved for subsequent re-use. The application allows a user to perform various tasks with respect to the workflow. Via an interface control presented by the application, the user instigates such tasks. In response, the application causes the task to be performed for each document in the workflow in an order corresponding to the arrangement of the documents within the workflow. For example, the application may render and print each document in the workflow. Or, the application may generate a combined workflow report.

20 Claims, 5 Drawing Sheets

(56) References Cited

U.S. PATENT DOCUMENTS

| | | | |
|---|---|---|---|
| 5,613,105 A | 3/1997 | Xbikowski et al. |
| 5,794,228 A | 8/1998 | French et al. |
| 5,794,229 A | 8/1998 | French et al. |
| 5,918,225 A | 6/1999 | White et al. |
| 5,999,911 A | 12/1999 | Berg et al. |
| 6,236,994 B1 | 5/2001 | Swartz et al. |
| 6,289,334 B1 | 9/2001 | Reiner et al. |
| 6,311,181 B1 | 10/2001 | Lee et al. |
| 6,321,274 B1 | 11/2001 | Shakib et al. |
| 6,370,538 B1 | 4/2002 | Lamping et al. |
| 6,851,108 B1 | 2/2005 | Syme et al. |
| 6,857,120 B1 | 2/2005 | Arnold et al. |
| 6,877,137 B1 | 4/2005 | Rivette et al. |
| 6,976,024 B1 | 12/2005 | Chavez et al. |
| 7,406,592 B1 | 7/2008 | Polyudov |
| 7,519,589 B2 | 4/2009 | Charnock et al. |
| 7,546,353 B2 | 6/2009 | Hesselink et al. |
| 7,627,489 B2 | 12/2009 | Schaeffer et al. |
| 7,783,679 B2 | 8/2010 | Bley |
| 7,853,573 B2 | 12/2010 | Warner et al. |
| 7,877,421 B2 | 1/2011 | Berger et al. |
| 7,908,521 B2 | 3/2011 | Sridharan et al. |
| 7,979,424 B2 | 7/2011 | Dettinger et al. |
| 8,073,857 B2 | 12/2011 | Sreekanth |
| 8,103,962 B2 | 1/2012 | Embley et al. |
| 8,417,715 B1 | 4/2013 | Bruckhaus et al. |
| 8,429,194 B2 | 4/2013 | Aymeloglu et al. |
| 8,429,527 B1 | 4/2013 | Arbogast |
| 8,433,702 B1 | 4/2013 | Carrino et al. |
| 8,499,287 B2 | 7/2013 | Shafi et al. |
| 8,560,494 B1 | 10/2013 | Downing et al. |
| 2002/0184111 A1 | 12/2002 | Swanson |
| 2003/0004770 A1 | 1/2003 | Miller et al. |
| 2003/0023620 A1 | 1/2003 | Trotta |
| 2003/0093755 A1 | 5/2003 | O'Carroll |
| 2003/0105833 A1 | 6/2003 | Daniels |
| 2004/0088177 A1 | 5/2004 | Travis et al. |
| 2004/0098731 A1 | 5/2004 | Demsey et al. |
| 2004/0103088 A1 | 5/2004 | Cragun et al. |
| 2004/0139212 A1 | 7/2004 | Mukherjee et al. |
| 2005/0004911 A1 | 1/2005 | Goldberg et al. |
| 2005/0021397 A1 | 1/2005 | Cui et al. |
| 2005/0021877 A1* | 1/2005 | Varpela et al. ............ 710/1 |
| 2005/0120080 A1 | 6/2005 | Weinreb et al. |
| 2005/0183005 A1 | 8/2005 | Denoue et al. |
| 2005/0226473 A1 | 10/2005 | Ramesh |
| 2005/0278286 A1 | 12/2005 | Djugash et al. |
| 2006/0004740 A1 | 1/2006 | Dettinger et al. |
| 2006/0070046 A1 | 3/2006 | Balakrishnan et al. |
| 2006/0074730 A1* | 4/2006 | Shukla et al. ............ 705/8 |
| 2006/0074967 A1 | 4/2006 | Shaburov |
| 2006/0080616 A1* | 4/2006 | Vogel et al. ............ 715/769 |
| 2006/0209085 A1 | 9/2006 | Wong et al. |
| 2006/0288046 A1 | 12/2006 | Gupta et al. |
| 2007/0027851 A1 | 2/2007 | Kruy et al. |
| 2007/0094248 A1 | 4/2007 | McVeigh et al. |
| 2007/0113164 A1 | 5/2007 | Hansen et al. |
| 2007/0168336 A1 | 7/2007 | Ransil et al. |
| 2007/0178501 A1 | 8/2007 | Rabinowitz et al. |
| 2007/0192281 A1 | 8/2007 | Cradick et al. |
| 2007/0260582 A1 | 11/2007 | Liang |
| 2008/0126344 A1 | 5/2008 | Hoffman et al. |
| 2008/0126951 A1 | 5/2008 | Sood et al. |
| 2008/0201313 A1 | 8/2008 | Dettinger et al. |
| 2008/0215543 A1 | 9/2008 | Huang et al. |
| 2009/0006150 A1 | 1/2009 | Prigge et al. |
| 2009/0007056 A1 | 1/2009 | Prigge et al. |
| 2009/0043762 A1 | 2/2009 | Shiverick et al. |
| 2009/0055487 A1 | 2/2009 | Moraes et al. |
| 2009/0083275 A1 | 3/2009 | Jacob et al. |
| 2009/0094217 A1 | 4/2009 | Dettinger et al. |
| 2009/0144747 A1 | 6/2009 | Baker |
| 2009/0161147 A1 | 6/2009 | Klave |
| 2009/0172674 A1 | 7/2009 | Bobak et al. |
| 2009/0193012 A1 | 7/2009 | Williams |
| 2009/0248721 A1 | 10/2009 | Burton et al. |
| 2009/0282068 A1 | 11/2009 | Shockro et al. |
| 2009/0299830 A1 | 12/2009 | West et al. |
| 2010/0011282 A1 | 1/2010 | Dollard et al. |
| 2010/0073315 A1 | 3/2010 | Lee et al. |
| 2010/0082671 A1 | 4/2010 | Li et al. |
| 2010/0145902 A1 | 6/2010 | Boyan et al. |
| 2010/0161646 A1 | 6/2010 | Ceballos et al. |
| 2010/0169376 A1 | 7/2010 | Chu |
| 2010/0169405 A1 | 7/2010 | Zhang |
| 2010/0199167 A1 | 8/2010 | Uematsu et al. |
| 2011/0035396 A1 | 2/2011 | Merz et al. |
| 2011/0041084 A1 | 2/2011 | Karam |
| 2011/0074811 A1 | 3/2011 | Hanson et al. |
| 2011/0093490 A1 | 4/2011 | Schindlauer et al. |
| 2011/0131547 A1 | 6/2011 | Elaasar |
| 2011/0208822 A1 | 8/2011 | Rathod |
| 2011/0258216 A1 | 10/2011 | Supakkul et al. |
| 2011/0270871 A1 | 11/2011 | He et al. |
| 2012/0078595 A1 | 3/2012 | Balandin et al. |
| 2012/0102022 A1 | 4/2012 | Miranker et al. |
| 2012/0173381 A1 | 7/2012 | Smith |
| 2012/0174057 A1 | 7/2012 | Narendra et al. |
| 2012/0188252 A1 | 7/2012 | Law |
| 2012/0284719 A1 | 11/2012 | Phan et al. |
| 2013/0226944 A1 | 8/2013 | Baid et al. |
| 2013/0232220 A1 | 9/2013 | Sampson |
| 2014/0012886 A1 | 1/2014 | Downing et al. |
| 2014/0237354 A1 | 2/2014 | Burr et al. |
| 2014/0074888 A1 | 3/2014 | Potter et al. |
| 2014/0108074 A1 | 4/2014 | Miller et al. |
| 2014/0115589 A1 | 4/2014 | Marinelli et al. |
| 2014/0115610 A1 | 4/2014 | Marinelli et al. |

FOREIGN PATENT DOCUMENTS

| | | | |
|---|---|---|---|
| EP | 2743839 | | 6/2014 |
| GB | 2366498 | | 3/2002 |
| WO | WO0034895 | | 6/2000 |
| WO | WO 0125906 | * | 4/2001 |
| WO | WO2010030917 | | 3/2010 |

OTHER PUBLICATIONS

PCT/US2009/056707, International Search Report and Written Opinion, mailed Mar. 2, 2010, 11 pages.

"A Quick Guide to UniProtKB Swiss-Prot & TrEMBL," Sep. 2011, pp. 2.

Bae et al., "Partitioning Algorithms for the Computation of Average Iceberg Queries," DaWaK 2000, LNCS 1874, pp. 276-286.

Bogle, Phillip Lee, "Reducing Cross-Domain Call Overhead Using Batched Futures," May 1994, Massachusetts Institute of Technology, pp. 96.

Canese et al., "Chapter 2: PubMed: The Bibliographic Database," The NCBI Handbook, Oct. 2002, pp. 1-10.

Delcher et al., "Identifying Bacterial Genes and Endosymbiont DNA with Glimmer," BioInformatics, vol. 23, No. 6, 2007, pp. 673-679.

Donjerkovic et al., "Probabilistic Optimization of Top N Queries," Proceedings of the 25th VLDB Conference, Edinburgh, Scotland, 1999, pp. 411-422.

Fang et al., "Computing Iceberg Queries Efficiently," Proceedings of the 24th VLDB Conference New York, 1998, pp. 299-310.

Han et al., "Efficient Computation of Iceberg Cubes with Complex Measures," ACM Sigmod, May 21-24, 2001, pp. 1-12.

Karp et al., "A Simple Algorithm for Finding Frequent Elements in Streams and Bags," ACM Transactions on Database Systems, vol. 28, No. 1, Mar. 2003, pp. 51-55.

Kitts, Paul, "Chapter 14: Genome Assembly and Annotation Process," The NCBI Handbook, Oct. 2002, pp. 1-21.

Leela et al., "On Incorporating Iceberg Queries in Query Processors," Technical Report, TR-2002-01, Database Systems for Advanced Applications Lecture Notes in Computer Science, 2004, vol. 2973.

Liu et al., "Methods for Mining Frequent Items in Data Streams: An Overview," Knowledge and Information Systems, vol. 26, No. 1, Jan. 2011, pp. 1-30.

(56) References Cited

OTHER PUBLICATIONS

Madden, Tom, "Chapter 16: The BLAST Sequence Analysis Tool," The NCBI Handbook, Oct. 2002, pp. 1-15.
Mendes et al., "TcruziKB: Enabling Complex Queries for Genomic Data Exploration," IEEE International Conference on Semantic Computing, Aug. 2008, pp. 432-439.
Mizrachi, Ilene, "Chapter 1: Gen Bank: The Nuckeotide Sequence Database," The NCBI Handbook, Oct. 2002, pp. 1-14.
Russell et al., "Nitelight: A Graphical Tool for Semantic Query Construction," 2008, pp. 10.
Sigrist, et al., "PROSITE, a Protein Domain Database for Functional Characterization and Annotation," Nucleic Acids Research, 2010, vol. 38, pp. D161-D166.
Sirotkin et al., "Chapter 13: The Processing of Biological Sequence Data at NCBI," The NCBI Handbook, Oct. 2002, pp. 1-11.
Smart et al., "A Visual Approach to Semantic Query Design Using a Web-Based Graphical Query Designer," 16th International Conference on Knowledge Engineering and Knowledge Management (EKAW 2008), Acitrezza, Catania, Italy, Sep. 29-Oct. 3, 2008, pp. 16.
"The FASTA Program Package," fasta-36.3.4, Mar. 25, 2011, pp. 29.
Wikipedia, "Machine Code", p. 1-5, Aug. 9, 2014.
Official Communication for European Patent Application No. 14159629.6 dated Jul. 31, 2014.
Kahan et al., "Annotea: An Open RDF Infrastructure for Shared Web Annotations", Computer Networks, vol. 39, No. 5, Aug. 5, 2002, pp. 589-608.
Chazelle et al., "The Bloomier Filter: An Efficient Data Structure for Static Support Lookup Tables," SODA '04 Proceedings of the Fifteenth Annual ACM-SIAM Symposium on Discrete Algorithms, 2004, p. 30-39.
Official Communication for European Patent Application No. 14159175.0 dated Jul. 17, 2014.
Milena et al., "An Architecture for Recycling Intermediates in a Column-Store," Proceedings of the 35th Sigmod International Conference on Management of Data, Sigmod '09, Jun. 29, 2009, p. 309.
Official Communication for New Zealand Patent Application No. 622414 dated Mar. 24, 2014.
Official Communication for New Zealand Patent Application No. 622484 dated Apr. 2, 2014.
"A Tour of Pinboard" dated May 15, 2014 taken from https://pinboard.in/tour/, 6 pages.

* cited by examiner

DOCUMENT-BASED WORKFLOWS

PRIORITY CLAIM

This application claims benefit under 35 U.S.C. §120 as a Continuation of U.S. patent application Ser. No. 12/556,310, filed Sep. 9, 2009, which claims the benefit of Provisional Application 61/097,059, entitled "Collaborative Interface Enhancements" and filed Sep. 15, 2008, and which also claims the benefit of Provisional Application 61/122,695, entitled "WorkFlows, Screenshot Techniques, and Sharing Information across Servers" and filed Dec. 15, 2008. The entire contents of each of these three applications are hereby incorporated by reference for all purposes as if fully set forth herein. The applicant(s) hereby rescind any disclaimer of claim scope in the parent application(s) or the prosecution history thereof and advise the USPTO that the claims in this application may be broader than any claim in the parent application(s);

FIELD OF THE INVENTION

Embodiments of the invention described herein relate generally to document management, and, more specifically, to techniques for organizing and storing information about collections of documents.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

In the course of a project, a user will often create a large number of interrelated documents. For example, as part of a financial analysis project, a user may create separate documents analyzing each of a financial instrument group, a date set, an index created using the date set and the instrument group, a regression analysis performed on the index, and a trading strategy based on the regression.

These documents, however, are typically difficult to manage. File systems are very limited in their ability to organize, view, and label documents. Beyond placing documents in different folders in a file system, a user has no way to organize documents. Moreover, for many tasks that the user would like to perform on a project level, such as printing, updating, executing, or sharing, the user must perform the task manually for each related document, often in a prescribed order that is not reflected in the way the documents are organized within the file system. Manual performance of these tasks for each document in a project is tedious and time-consuming.

Furthermore, it can be difficult to keep track of the ordering of the documents as well as interdependencies between documents that may necessitate such ordering. A user lacks, for instance, any convenient mechanism for communicating information about document ordering and interdependencies to another user.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described herein according to the following outline:

1.0. General Overview
2.0. Creating a Workflow
3.0. Workflow Data Structure
4.0. Managing a Workflow
5.0. Workflow tasks
6.0. Workflow Interface
7.0. Implementation Mechanism—Hardware Overview
8.0. Extensions and Alternatives 1.0. General Overview According to an embodiment, a workflow application may allow users to store, manage, and perform tasks related to workflows comprised of ordered sets of documents.

According to an embodiment, a workflow application may present a user with an interface for creating and managing a workflow. The interface may be, for instance, a graphical user interface that includes icons representing the documents and various other aspects of the workflow. Via the interface, the user may add documents to the workflow. Each document may be assigned to a particular position in the workflow. For example, a document that depends on the results of another document may be ordered after that other document. Via the interface, the user may save data defining the workflow. In this manner, the workflow may be shared or preserved for subsequent re-use.

According to an embodiment, a workflow application may allow a user to perform various tasks with respect to the workflow. Via an interface control presented by the workflow application, the user may instigate a workflow task. The workflow application may cause the task to be performed for each document in the workflow in an order corresponding to the arrangement of the documents within the workflow. According to an embodiment, one such task causes the application to render and print each document in the workflow, according to the order of the documents in the workflow. According to an embodiment, another such task causes the application to open all of the documents in the workflow, and perform a find and replace operation in each of the documents.

In other aspects, the invention encompasses a computer apparatus and a computer-readable medium configured to carry out the foregoing steps.

2.0. Creating a Workflow

Figure 1:
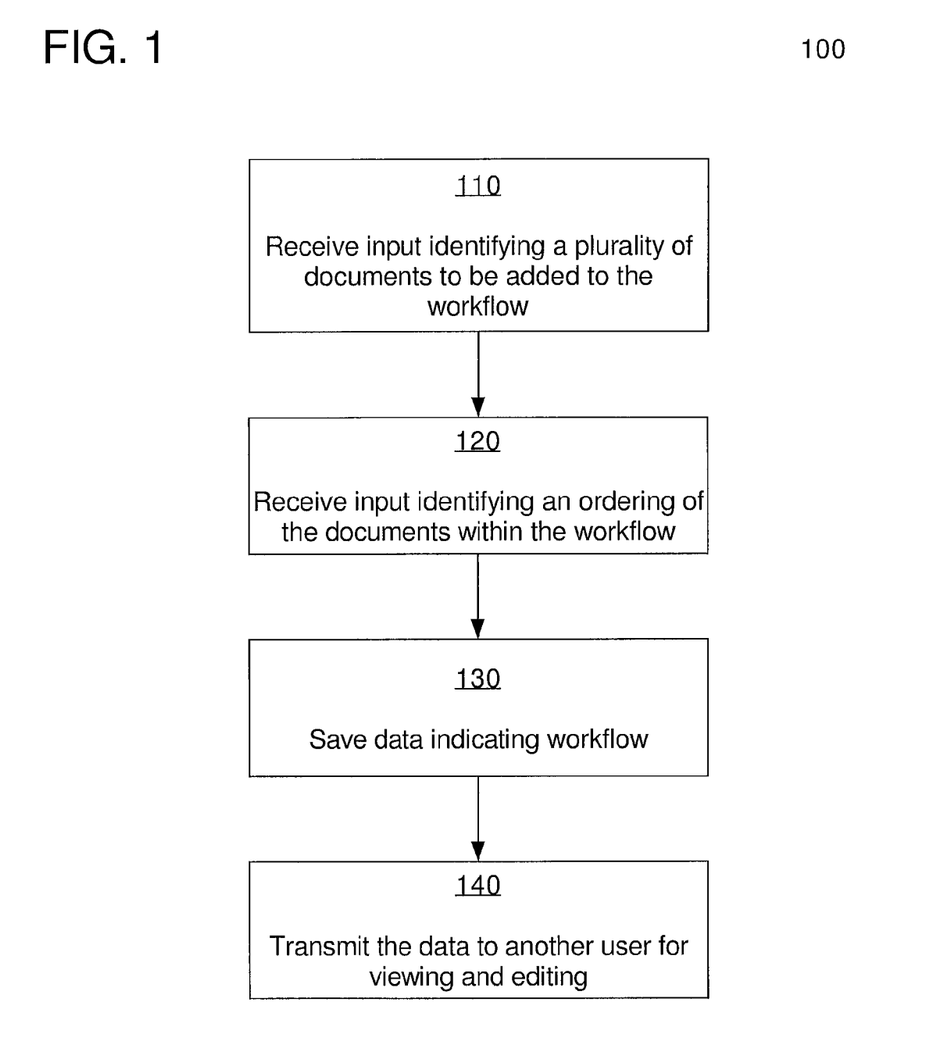
FIG. 1 is a flow chart illustrating a method for creating a workflow using a workflow application.

FIG. 1 is a flowchart 100 illustrating a method for creating a workflow using a workflow application. The workflow application may be executed in a wide variety of computer-based systems, including, for instance, a computer system connected to a Palantir Finance server.

At step 110, the workflow application receives input identifying a plurality of documents to be added to the workflow. The input may be received via a user interface presented by the workflow application. For instance, the input may be received via file selection dialogs of the user interface or drag-and-drop operations involving the user interface. The input may also or alternatively be text-based input read by the workflow application as a result of, for example, an import operation or shell-based command.

The workflow application may also allow a user to create documents which are then added to the workflow.

According to an embodiment, the workflow application is also a document viewing or editing application. The document viewing or editing interface may therefore feature a control for adding a currently viewed document to a workflow.

The added documents may be of any document type. For example, they may be word-processing documents, image files, spreadsheets, or graphs. The documents may include code or other data that, when interpreted by a document viewing application, causes document viewing applications to render various items dynamically based on data imported from another document or data source. The documents may also include code that uses data from some other source to derive new data. The documents may also be workflows in and of themselves, so that a workflow is comprised of other workflows.

Documents may reside in any location accessible to the workflow application, including a local file system or a centralized document management server, such as a Palantir Finance server. According to some embodiments, the documents may all have been created using a common document editing application, such as a Palantir Finance client. According to other embodiments, some or all of the documents may have been created using different document editing applications.

At step 120, the workflow application receives input identifying an ordering of the documents within the workflow. Again, the input may be received via a user interface presented by the workflow application. The input may be based on, for example, textual input identifying a position number of the document in the ordering. Or, the input may be a drag and drop operation, such as occurring when a user operating a mouse clicks on and drags an icon for one document to a higher position in a graphical depiction of the ordered documents.

According to an embodiment, steps 110 and 120 are performed concurrently, in that input that identifies a document to be added to the workflow explicitly or implicitly identifies a position for that document in the ordering of the workflow. For example, in the case of a user adding documents to the workflow one-by-one, the workflow application may implicitly assume that an added document is always to be ordered in the last position of the workflow.

At step 130, the workflow application saves data indicating the workflow. The workflow application may perform step 130, for instance, in response to a user clicking on a "save" control, the lapsing of a certain amount of time, or the occurrence of workflow-related events. The workflow application may save the data in any of a variety of suitable formats, some of which are discussed in subsequent sections.

At step 140, the workflow application may transmit the data to another user for viewing and editing. Step 140 is optional, in that it illustrates one of the many benefits to having saved data indicating the workflow. It may be useful to instead perform other actions with respect to the saved data, such as opening the saved data with a workflow application at a later date to continue work with the workflow.

3.0. Workflow Data Structure

A workflow may be represented by structured data hereinafter referred to as workflow data. Workflow data may identify documents in the workflow by reference. For example, the workflow data may include data indicating the location of or a unique identifier for some or all of the documents in the workflow. Workflow data may also or instead identify documents by incorporation. In other words, workflow data may contain copies of some or all of the documents in the workflow. According to an embodiment, a workflow application may present an interface control for selecting how some or all of the documents in the workflow should be identified in the workflow data.

Workflow data may further indicate the ordering of the documents in the workflow. For example, data identifying the documents in the workflow may be placed in the same order as the documents were positioned within the workflow. As another example, data identifying a document in the workflow may have associated therewith data indicating a numerical position of the document in the workflow.

As another example, data identifying a document in the workflow may implicitly indicate an ordering for a document by indicating a relationship to or a dependency on another document. For example, a certain document may depend upon outputs generated during the processing of another document, and therefore data identifying the certain document may indicate a dependency on the other document. Thus, the workflow application may assume that the certain document is ordered after the other document, so as to ensure that the outputs are properly generated.

Workflow data may be stored in any format capable of identifying both the documents in the workflow and the ordering of those documents in the workflow. According to an embodiment, data indicating the workflow may be XML or binary data. For example, the following XML data define a two document workflow, wherein the documents are identified by reference.

```
<WorkflowDocument>
  <header>
    <type>
      <displayName>Workflow</displayName>
      <documentClass>WorkflowDocument</documentClass>
      <fingerprint>STANDARD</fingerprint>
      <parserName>Workflow</parserName>
      <pluralDisplayName>Workflows</pluralDisplayName>
      <iconName>workflow</iconName>
      <helpURISuffix>workflow.html</helpURISuffix>
    </type>
    <childIds/>
    <id>9b73dee5-febc-4746-b951-678eda641e48</id>
    <name>Nifty Workflow</name>
    <description>description</description>
    <revision>1</revision>
    <creator version="1">
      <authenticatorId>builtin</authenticatorId>
      <userId>andy</userId>
    </creator>
    <lastModifiedDate>1229151071793</lastModifiedDate>
    <saveState>NORMAL</saveState>
    <isDraft>false</isDraft>
  </header>
  <workflowSteps>
    <propertyName>WorkflowDocument.EVT_LIST_CHANGED
    </propertyName>
    <registerChildModels>true</registerChildModels>
```

-continued

```
<list>
    <innerList>
        <IdentityArrayList_-Pointer>
            <value class="WorkflowStep">
                <document class="ChartDocument" resolves-to="DocumentLinkingConverter$DocumentLink">
                    <documentId>e5e16186-071c-4dd4-b07e-20293f957878</documentId>
                    <revision>1</revision>
                </document>
                <title>Nifty Chart</title>
                <description>Description</description>
            </value>
        </IdentityArrayList_-Pointer>
        <IdentityArrayList_-Pointer>
            <value class="WorkflowStep">
                <document class="DateSet" resolves-to="DocumentLinkingConverter$DocumentLink">
                    <documentId>8f1b7b0a-e3e0-429d-8e62-d51a9758042d</documentId>
                    <revision>1</revision>
                </document>
                <title>Nifty Analysis</title>
                <description>Description</description>
            </value>
        </IdentityArrayList_-Pointer>
    </innerList>
</list>
</workflowSteps>
</WorkflowDocument>
```

4.0. Managing a Workflow

Figure 2:
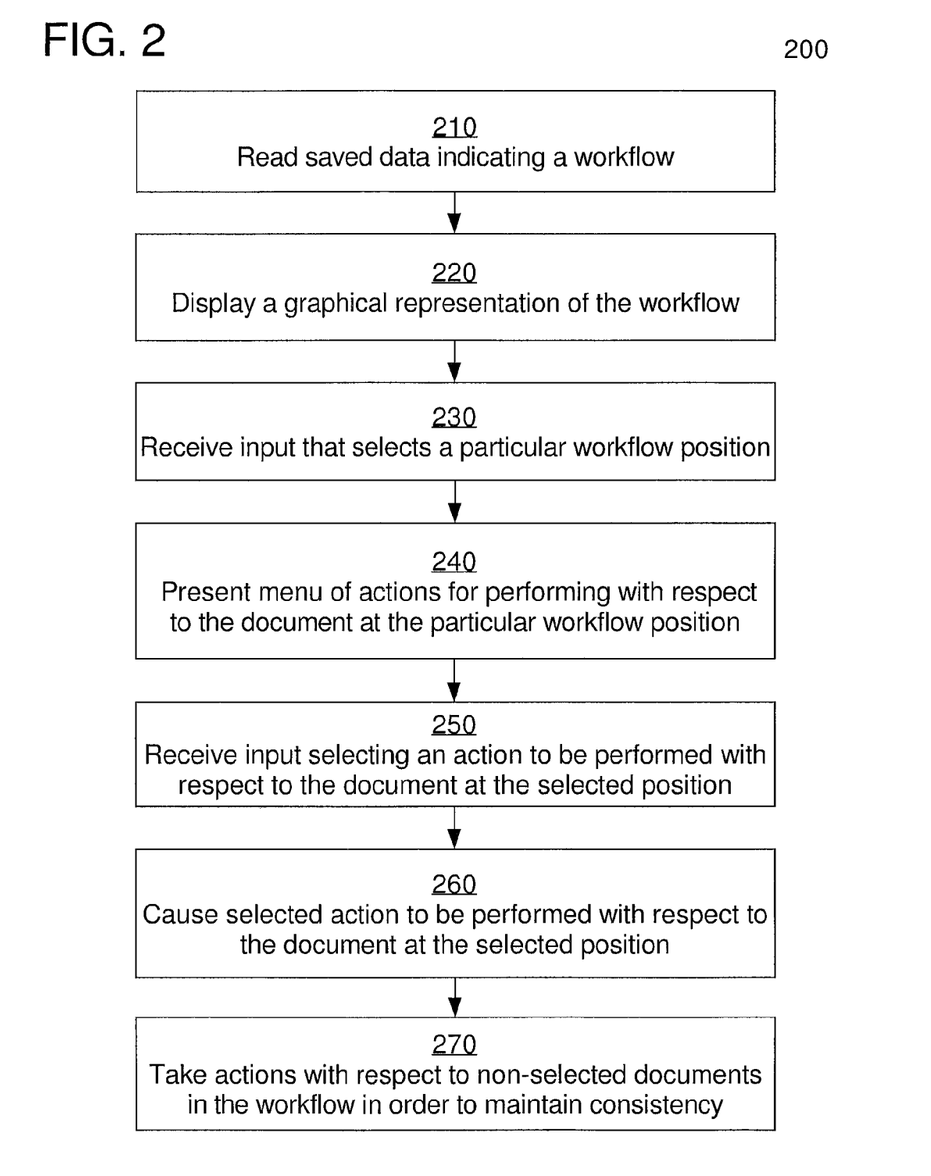
FIG. 2 is a flow chart illustrating a method for managing a workflow within a workflow application.

FIG. 2 is a flow chart illustrating a method for managing a workflow within a workflow application.

At step 210, in response to user input, the workflow application reads saved data indicating a workflow. For example, the workflow application may receive input indicating an open command for a file in which the data indicating the workflow has been saved.

At step 220, the workflow application displays a graphical representation of the workflow, including controls representing each ordered position within the workflow along with the document corresponding to that position.

At step 230, the workflow application receives input that selects a particular workflow position.

At step 240, the workflow application optionally presents a menu of actions that may be performed with respect to the document at the particular workflow position. Such a menu may be displayed, for example, in response to right-click input selecting the particular workflow position.

At step 250, the workflow application receives further input selecting an action to be performed with respect to the document at the selected position. For example, the input may be a drag and drop operation that moves the document to another position. Or, the input may be a second click indicating that the workflow application should cause a document viewing or document editing application to open the document. Or, the input may be a keystroke that causes the workflow application to delete the document at the selected position. Or, when a menu of actions has been presented in accordance with step 240, the input may be input that selects an action from the menu. In fact, various different types of input may select from a wide variety of other actions that be performed with respect to a document at a selected position.

At step 260, the workflow application performs (or causes to be performed) the selected action with respect to the document at the selected position. For example, if the selected action was to delete the document, the workflow application may delete the document. This may only delete the document from the workflow, or it may delete the document from the file system where it is stored. As part of this step, the workflow application may need to communicate with one or more other applications, so as to cause the other applications to perform various steps. To this end, the workflow application may invoke an instance of another application. The workflow application may then send instructions to and receive results from the other application via an interface for the other application, such as an application programming interface (API) or a command-line interface. For example, if the indicated action was to print the document, the workflow application may launch a separate document viewing application for the document. The workflow application may then issue a command to the document viewing application to print the document.

At step 270, the workflow application may optionally take actions with respect to non-selected documents in the workflow in order to maintain consistency throughout the workflow. For example, in response to a document deletion, the workflow may need to re-order other documents in the workflow. As another example, when another document is dependent upon data in the selected document, the workflow application may detect the dependency and update the other document based on the changes to the selected document. Where changes are made to the document using an external document editor, the workflow application may cause the external document editor to update or make corresponding changes to data in any dependent documents.

5.0. Workflow Tasks

Figure 3:
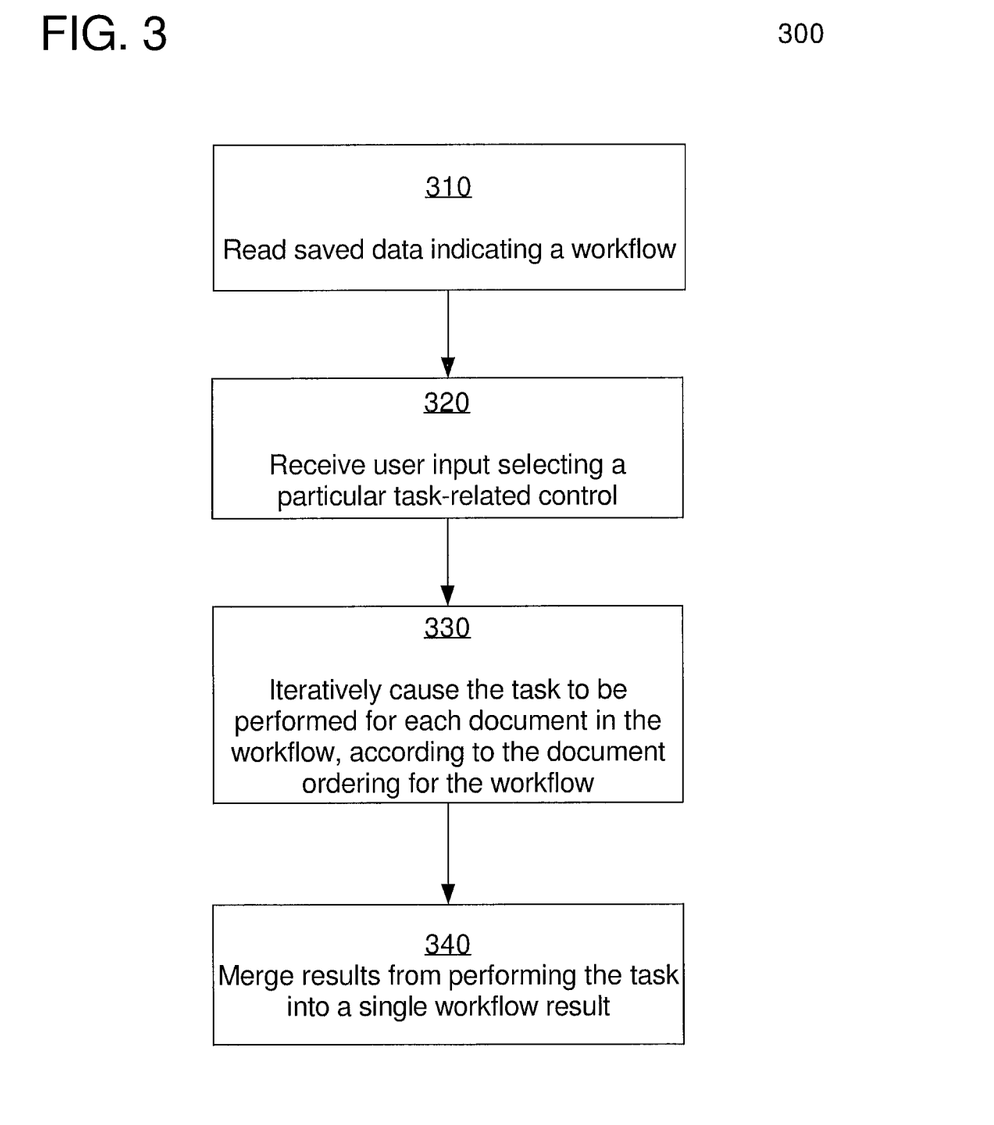
FIG. 3 is a flow chart illustrating a method for performing tasks with respect to an entire workflow.

FIG. 3 is a flow chart illustrating a method for performing tasks with respect to an entire workflow.

At step 310, in response to user input, the workflow application reads saved data indicating a workflow. For example, the workflow application may receive input indicating an open command with respect to a file in which the data indicating the workflow has been saved.

At step 320, the workflow application receives user input selecting a particular task-related control. For example, the workflow application may have presented a graphical user interface based on the workflow data. The graphical user interface may include menu controls for selecting any of a wide variety of tasks that may be performed with respect to the entire workflow, including printing, updating, rendering, screenshotting, exporting, saving, deleting, and executing.

At step 330, the workflow application iteratively performs (or causes to be performed) the task for each document in the workflow, according to the document ordering for the workflow. The workflow application may perform this step in a manner similar to step 260, but for each document indicated by the workflow. For example, the workflow application may perform a print task for the entire workflow by performing, for each document in the workflow, in the order indicated by the workflow, the steps of (1) opening the document in a document viewing or editing application and (2) triggering the print functionality of that document viewing application.

In one embodiment, the workflow application must further cause a document viewing and editing application to render or update data immediately prior to performing the selected task for the document. For example, where a document in the second position of a workflow relies on data generated by scripts in a document from the first position of the workflow, the workflow application may cause the document to be updated with that data immediately prior to printing the document.

According to an embodiment, a workflow document may itself indicate a workflow. In such cases, when it comes time to perform a task with respect to the embedded workflow document, the task is performed recursively with respect to the ordered documents in the embedded workflow. Once each document in the embedded workflow has been processed, the workflow application may continue to perform the task with respect to the next document in the parent workflow.

In some embodiments, the workflow application must wait for the task to finish executing before proceeding to the next document. In other embodiments, where a document is not dependent on previous documents, the workflow application may perform the task with respect to the document without waiting for the task to complete for the previous document. The workflow application may further comprise logic for detecting such dependencies and determining when to perform various steps based on the detected dependencies.

At step 340, the workflow application optionally merges results from performing the task into a single workflow result. For example, the task selected in step 320 may have been to generate a reporting file, such as a PDF or PowerPoint document, for the entire workflow. The workflow application, in step 330, may have generated a report for each individual document. In step 340, the workflow application may therefore merge the individual report in the indicated order so as to create a single workflow report. According to an embodiment, individual results are arranged within the workflow result in the same order as their corresponding documents are positioned in the workflow. Thus, if results are not generated sequentially with respect to the workflow (as may occur in embodiments where the workflow application does not wait for one document to be generated before starting to generate results for another document), step 340 may involve the workflow application rearranging the results in the order of the workflow.

According to an embodiment, the workflow application may present controls for selecting whether or not to perform step 340. According to an embodiment, when step 340 is not performed, individual results are saved in separate files.

6.0. Workflow Interface

Figure 4:
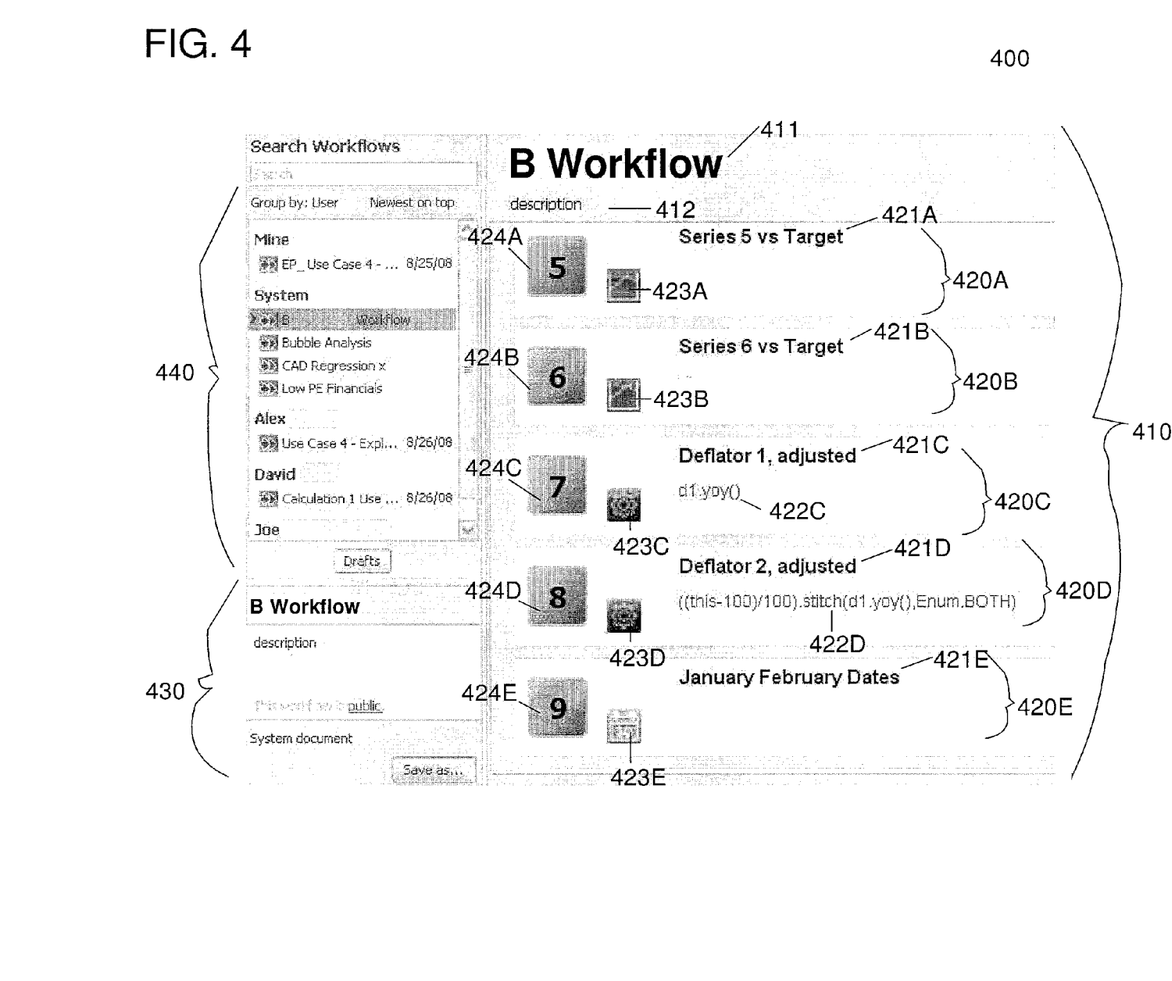
FIG. 4 depicts a user interface capable of managing workflows.

FIG. 4 depicts a user interface 400 capable of managing workflows. User interface 400 may be provided by a workflow application, such as the workflow applications discussed above.

User interface 400 includes a workflow interface 410 for presenting to a user various aspects of a workflow. Workflow interface 410 comprises: a title control 411, indicating that the depicted workflow has a title attribute of "B Workflow"; a descriptive control 412, indicating that the depicted workflow includes descriptive metadata describing the workflow as "description"; and step controls 420A-420E, each corresponding to a different step of the depicted workflow. Each of controls 411, 412, and 420A-420E allows a user to edit the depicted aspect of the workflow.

Each step depicted by step controls 420A-420E corresponds to a previously prepared document that is positioned within the workflow. Each document has been previously created as a result of user interaction with an application program, such as a financial data analysis program. By default, the order of the step controls represents the order in which the documents corresponding to the step controls were created and/or added to the depicted workflow. However, the user may reorder the documents using the step controls.

To assist the user in understanding the workflow, each step control 420A-420E may display various document attributes. These attributes may be described in or based upon metadata associated with the corresponding document. For instance, as indicated by title attributes 421A-421E, displayed inside of step controls 420A-420E, the documents corresponding to step controls 420A-420E are named "Series 5 vs Target," "Series 6 vs Target," "Deflator 4, adjusted", "Deflator 2, adjusted," and "January February Dates."

As another example of document attributes that may be displayed, step controls 420A-420E depict attributes that generally describe the contents of a document, such as description attributes 422C and 422D. Description attributes 422C and 422D indicate, respectively, that the document named "Deflator 4, adjusted" contains metadata describing the document as "d1.yoy( )", and that the document named "Deflator 2, adjusted" contains metadata describing the document as "((this−100)/100).stitch(d1.yoy( ),Enum.BOTH)."

As another example of document attributes that may be displayed, step controls 420A-420E also display document type icons, such as document type icons 423A-423E. These icons indicate the document type of each of the documents depicted in step controls 420A-420E. For example, icons 423A and 423B indicate that the documents named "Series 5 vs Target" and "Series 6 vs Target" are graph documents, icons 423C and 423D indicate that the documents named "Deflator 4, adjusted" and "Deflator 2, adjusted" are custom metric documents, and icon 423E indicates that that the document named "January February Dates" is a date set document.

Step controls 420A-420E may further display a wide variety of other attributes for other items of metadata associated with the corresponding documents. For example, metadata concerning access dates, modification dates, dependent objects, and ownership might be displayed. Moreover, the workflow application may create additional items of metadata for display in step controls 420A-420F, including thumbnail images based on screenshots or other renderings of information contained in or produced by the corresponding documents.

Step controls 420A-420E further display position attributes 424A-424E indicating the position of each document in the workflow. Since the documents are ordered, each document occupies a unique position in the workflow. As indicated by position attributes 424A-424E, those positions are as follows: the document named "Series 5 vs Target" is at position 5, the document named "Series 6 vs Target" is at position 6, the document named "Deflator 4, adjusted" is at position 7, the document named "Deflator 2, adjusted" is at position 8, and the document named "January February Dates" is at position 9. As implied by this ordering, the workflow may comprise other documents as well in positions 1-4. However, the ordering need not require a document in each position. Since a workflow may comprise any number of ordered documents, the workflow may further contain documents in other positions, such as positions 40, 41, and so on. It should also be noted that while step controls 420A-420E are currently ordered sequentially with respect to the workflow positions occupied by their corresponding documents, workflow interface 410 may also allow step controls 420A-420E to be sorted in other orders independent of workflow positions.

Workflow interface 410 is configured to receive user input via save control 430 that causes the workflow application to save workflow data. The user input may, for example, type in a name by which the workflow data is to be saved. The data indicating the workflow may then subsequently be re-accessed using a data access or "open" command on this name within workflow interface 410.

Workflow interface 410 is configured to receive user input that causes the workflow application to add documents to the workflow. A user may, for example, drag and drop an icon for a document from document listing 440 at or in between positions indicated by step controls 420A-420E. The document represented by the icon will then be inserted at the indicated position.

Workflow interface 410 is configured to receive user input that causes the workflow application to reorder the documents within the workflow. For example, a user may select step control 420B and either press an up arrow key or click and drag the mouse upwards to move document indicated by step control 420B to a different position in the workflow.

Workflow interface 410 is further configured to receive user input that causes the workflow application to perform certain actions with respect to individual documents within the workflow. For example, a user may select control 420B. In response to various combinations of mouse-clicking or key presses, the workflow application may perform any number of different actions with respect to the document indicated by step control 420B. Among the many actions that may be performed with respect to the document indicated by step control 420B are: modifying the position of the document, removing the document, opening the document for editing, updating data within the document, printing the document, and changing document metadata. The workflow application may also present a menu of the above-described and other actions in response to certain mouse-clicks or key presses.

Workflow interface 410 may be further configured to receive user input that causes the workflow application to perform certain tasks with respect to the entire workflow. For example, workflow interface 410 may include various toolbar controls that cause the workflow application to perform one or more actions on each document in the workflow. Among the many actions that may be performed with respect to the entire workflow are: simultaneously updating data within each document, printing each document individually or in a merged form, generating other individual or merged output by processing instructions embedded in each document, executing a script in each document, and changing metadata for each document.

Workflow interface 410 is merely an example of an interface that may be useful in creating, managing, and utilizing a workflow. Many other interfaces may also be used to provide the same workflow functionality as workflow interface 410.

7.0. Implementation Mechanism—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
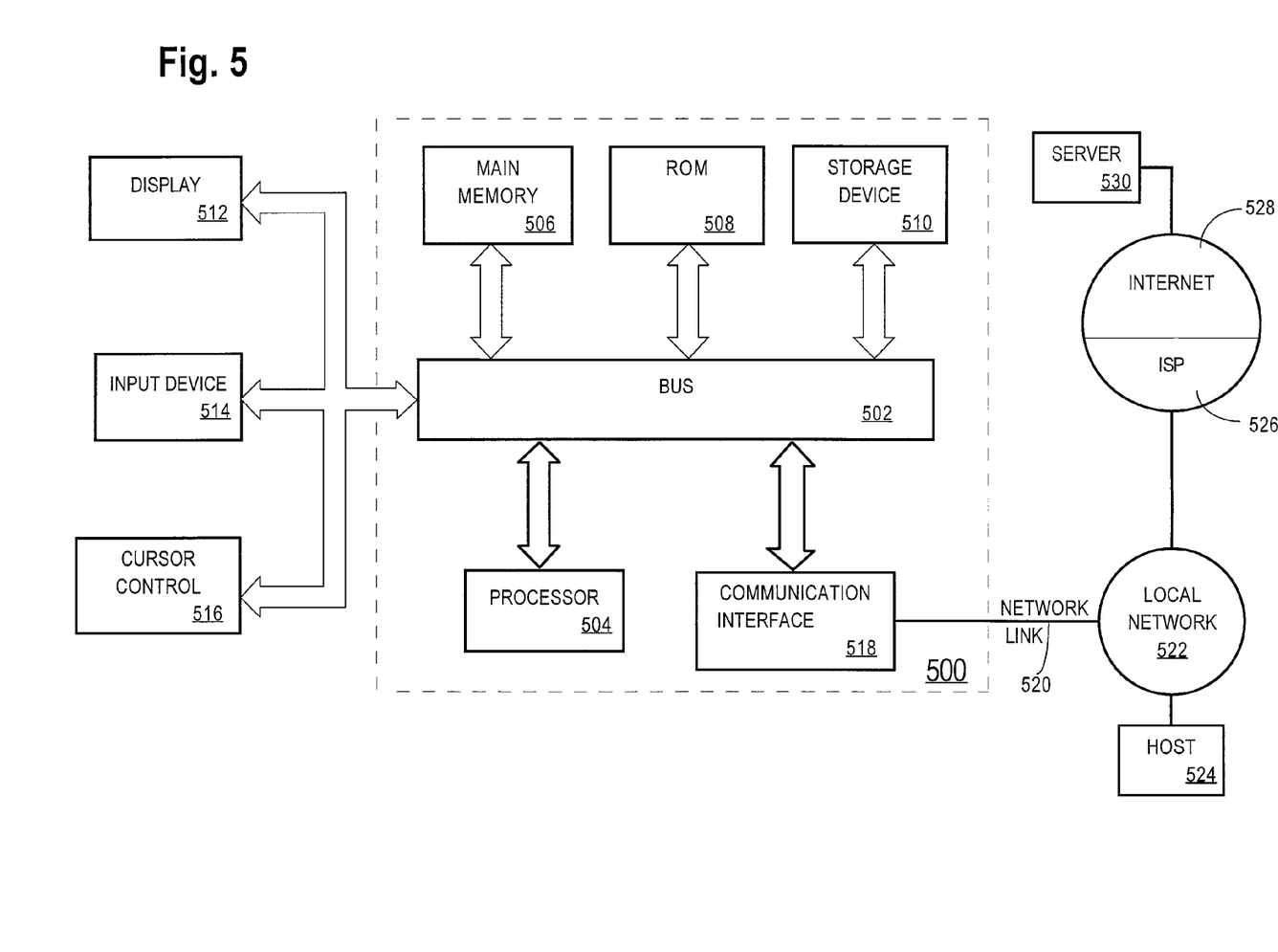
FIG. 5 is block diagram of a computer system upon which embodiments of the invention may be implemented.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any media that store data and/or instructions that cause a machine to operation in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

8.0. Extensions and Alternatives

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method comprising:
   receiving, in a graphical user interface area, first inputs specifying drag-and-drop operations with respect to icons representing documents, the drag-and-drop operations indicating that the documents are to be added to a workflow represented by the graphical user interface area;
   depicting the documents within the graphical user interface area in a particular order, wherein the particular order reflects dependencies between the documents, the particular order indicating at least that processing of a second document of the documents is dependent upon a first document output of a first document of the documents;
   processing the workflow to generate a first workflow output for the workflow, wherein processing the workflow comprises at least iteratively generating outputs for each of the documents, in accordance with the particular order, the outputs including the first document output and a second document output for the second document;
   wherein generating the first document output comprises executing instructions within the first document configured to cause deriving a data set from a data source external to the first document;
   wherein generating the second document output comprises executing instructions within the second document configured to cause generating one or more graphs based on the first document output;
   reprocessing the workflow to generate a second workflow output for the workflow, wherein the second workflow output differs from the first workflow output as a result of a change in the first document output;
   wherein the method is performed by one or more computing devices.

2. The method of claim 1, wherein the documents include one or more of: word-processing documents, image files, or spreadsheets.

3. The method of claim 1, wherein the first document is a second workflow.

4. The method of claim 1, wherein a workflow application performs the processing of the workflow, wherein generating the second document output comprises the workflow application sending instructions to an external application via an programming interface or command-line interface, and receiving results from the external application.

5. The method of claim 1, further comprising:
   in response to input in the graphical user interface at a first computer, causing a workflow data structure describing the workflow to be stored;
   wherein processing the workflow occurs at the first computer;
   subsequently accessing the workflow data structure at a second computer to reconstruct the workflow within the graphical user interface at the second computer;
   wherein reprocessing the workflow occurs at the second computer.

6. The method of claim 1, further comprising displaying information associated with the first document in response to receiving input in the graphical user interface that selects the first document.

7. The method of claim 1, wherein processing the workflow comprises iteratively processing each particular document of the documents by executing instructions associated with the particular document to generate particular output for the document, wherein the first workflow output and the second workflow output are outputs from processing a last document in the workflow.

8. One or more non-transitory computer-readable media storing instructions that, when executed by one or more computing devices, cause:
   receiving, in a graphical user interface area, first inputs specifying drag-and-drop operations with respect to icons representing documents, the drag-and-drop operations indicating that the documents are to be added to a workflow represented by the graphical user interface area;
   depicting the documents within the graphical user interface area in a particular order, wherein the particular order reflects dependencies between the documents, the particular order indicating at least that processing of a second document of the documents is dependent upon a first document output of a first document of the documents;
   processing the workflow to generate a first workflow output for the workflow, wherein processing the workflow comprises at least iteratively generating outputs for each of the documents, in accordance with the particular order, the outputs including the first document output and a second document output for the second document;
   wherein generating the first document output comprises executing instructions within the first document configured to cause deriving a data set from a data source external to the first document;
   wherein generating the second document output comprises executing instructions within the second document configured to cause generating one or more graphs based on the first document output;
   reprocessing the workflow to generate a second workflow output for the workflow, wherein the second workflow output differs from the first workflow output as a result of a change in the first document output.

9. The one or more non-transitory computer-readable media of claim 8, wherein the documents include one or more of: word-processing documents, image files, or spreadsheets.

10. The one or more non-transitory computer-readable media of claim 8, wherein the first document is a second workflow.

11. The one or more non-transitory computer-readable media of claim 8, wherein a workflow application performs the processing of the workflow, wherein generating the second document output comprises the workflow application sending instructions to an external application via an programming interface or command-line interface, and receiving results from the external application.

12. The one or more non-transitory computer-readable media of claim 8, wherein the instructions, when executed by the one or more computing devices, further cause:
   in response to input in the graphical user interface at a first computer, causing a workflow data structure describing the workflow to be stored;
   wherein processing the workflow occurs at the first computer;
   subsequently accessing the workflow data structure at a second computer to reconstruct the workflow within the graphical user interface at the second computer;
   wherein reprocessing the workflow occurs at the second computer.

13. The one or more non-transitory computer-readable media of claim 8, wherein the instructions, when executed by the one or more computing devices, further cause: displaying information associated with the first document in response to receiving input in the graphical user interface that selects the first document.

14. The one or more non-transitory computer-readable media of claim 8, wherein processing the workflow comprises iteratively processing each particular document of the documents by executing instructions associated with the particular document to generate particular output for the document, wherein the first workflow output and the second workflow output are outputs from processing a last document in the workflow.

15. The method of claim 1, wherein the instructions within the first document are configured to cause deriving the data set from the data source external to the first document by importing the data set from the data source.

16. The method of claim 1, wherein the data source is a third document of the documents.

17. The method of claim 1, wherein the instructions within the first document are configured to cause deriving the data set by using data imported from the data source in a coded algorithm.

18. The one or more non-transitory computer-readable media of claim 8, wherein the instructions within the first document are configured to cause deriving the data set from the data source external to the first document by importing the data set from the data source.

19. The one or more non-transitory computer-readable media of claim 8, wherein the data source is a third document of the documents.

20. The one or more non-transitory computer-readable media of claim 8, wherein the instructions within the first document are configured to cause deriving the data set by using data imported from the data source in a coded algorithm.

* * * * *